(12) United States Patent
Feng et al.

(10) Patent No.: US 11,928,730 B1
(45) Date of Patent: Mar. 12, 2024

(54) TRAINING MACHINE LEARNING MODELS WITH FAIRNESS IMPROVEMENT

(71) Applicant: Social Finance, Inc., San Francisco, CA (US)

(72) Inventors: Yonghan Feng, New York, NY (US); Sijia Liu, Fremont, CA (US); Ratinder Bedi, Danville, CA (US); Aaron Webster, Isle of Palms, SC (US)

(73) Assignee: Social Finance, Inc., San Francisco, CA (US)

( * ) Notice: Subject to any disclaimer, the term of this patent is extended or adjusted under 35 U.S.C. 154(b) by 0 days.

(21) Appl. No.: 18/203,514

(22) Filed: May 30, 2023

(51) Int. Cl.
*G06Q 40/00* (2023.01)
*G06Q 40/03* (2023.01)

(52) U.S. Cl.
CPC ................................. *G06Q 40/03* (2023.01)

(58) Field of Classification Search
CPC ............................. G06Q 40/02; G06Q 40/03
USPC .................................................. 705/4, 35–45
See application file for complete search history.

(56) References Cited

U.S. PATENT DOCUMENTS

| | | |
|---|---|---|
| 2019/0043070 A1 | 2/2019 | Merrill et al. |
| 2019/0378210 A1 | 12/2019 | Merrill et al. |
| 2020/0302309 A1 | 9/2020 | Golding |
| 2020/0302524 A1 | 9/2020 | Kamkar et al. |
| 2020/0387836 A1 | 12/2020 | Nasr-azadani et al. |
| 2021/0248503 A1 | 8/2021 | Hickey et al. |
| 2021/0287119 A1 | 9/2021 | Rink et al. |
| 2021/0304285 A1* | 9/2021 | Alahmady ......... G06Q 30/0201 |
| 2021/0383268 A1 | 12/2021 | Miroshnikov et al. |
| 2022/0004923 A1 | 1/2022 | Kamkar et al. |
| 2022/0076080 A1 | 3/2022 | Hacmon et al. |
| 2022/0101062 A1 | 3/2022 | Fischer et al. |
| 2022/0114399 A1* | 4/2022 | Castiglione ............ G06N 3/084 |
| 2022/0129793 A1 | 4/2022 | Sato |
| 2022/0164877 A1 | 5/2022 | Kamkar et al. |
| 2022/0172004 A1 | 6/2022 | Das et al. |
| 2022/0414766 A1 | 12/2022 | Miroshnikov et al. |
| 2023/0105547 A1* | 4/2023 | Kamkar ................. G06Q 40/03 705/38 |
| 2023/0244991 A1* | 8/2023 | Wilson ................... G06N 20/00 706/12 |

FOREIGN PATENT DOCUMENTS

| | | |
|---|---|---|
| CN | 113705909 A | 11/2021 |
| WO | 2022115402 A1 | 6/2022 |
| WO | 2022183019 A1 | 9/2022 |

OTHER PUBLICATIONS

Finreglab, "The Use of Machine Learning for Credit Underwriting," retrieved from https://finreglab.org/wp-content/uploads/2021/09/The-Use-of-ML-for-Credit-Underwriting-Market-and-Data-Science-Context_09-16-2021 Sep. 2021.

* cited by examiner

*Primary Examiner* — Jessica Lemieux
*Assistant Examiner* — Mohammed H Mustafa
(74) *Attorney, Agent, or Firm* — Bryan Cave Leighton Paisner LLP (57) ABSTRACT

A method including training a machine-learning model, based on historical data, with a maximization problem and one or more minimization problems to improve one or more fairness metrics. The method also can include receiving real-time data. The method additionally can include generating a risk score based on the machine-learning model, as trained, and the real-time data. Other embodiments are described.

16 Claims, 8 Drawing Sheets

TRAINING MACHINE LEARNING MODELS WITH FAIRNESS IMPROVEMENT

TECHNICAL FIELD

This disclosure relates generally to training machine-learning models with fairness improvement, such as in the financial industry.

BACKGROUND

Machine-learning models generally are trained on historical data and applied to new data. For example, machine-learning models can be applied to new data to make determinations and/or evaluate risk. Generally, machine-learning models are trained to maximize a prediction power, which sometimes is expressed as minimizing a loss function. However, many machine-learning models result in outputs that lack fairness, such as outputs that involve disparate treatment or disparate impact for certain legally protected groups. In the financial industry, such outputs can pose legal issues.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, ten seconds, one minute, five minutes, ten minutes, thirty minutes, or one hour, for example.

DESCRIPTION OF EXAMPLES OF EMBODIMENTS

Figure 1:
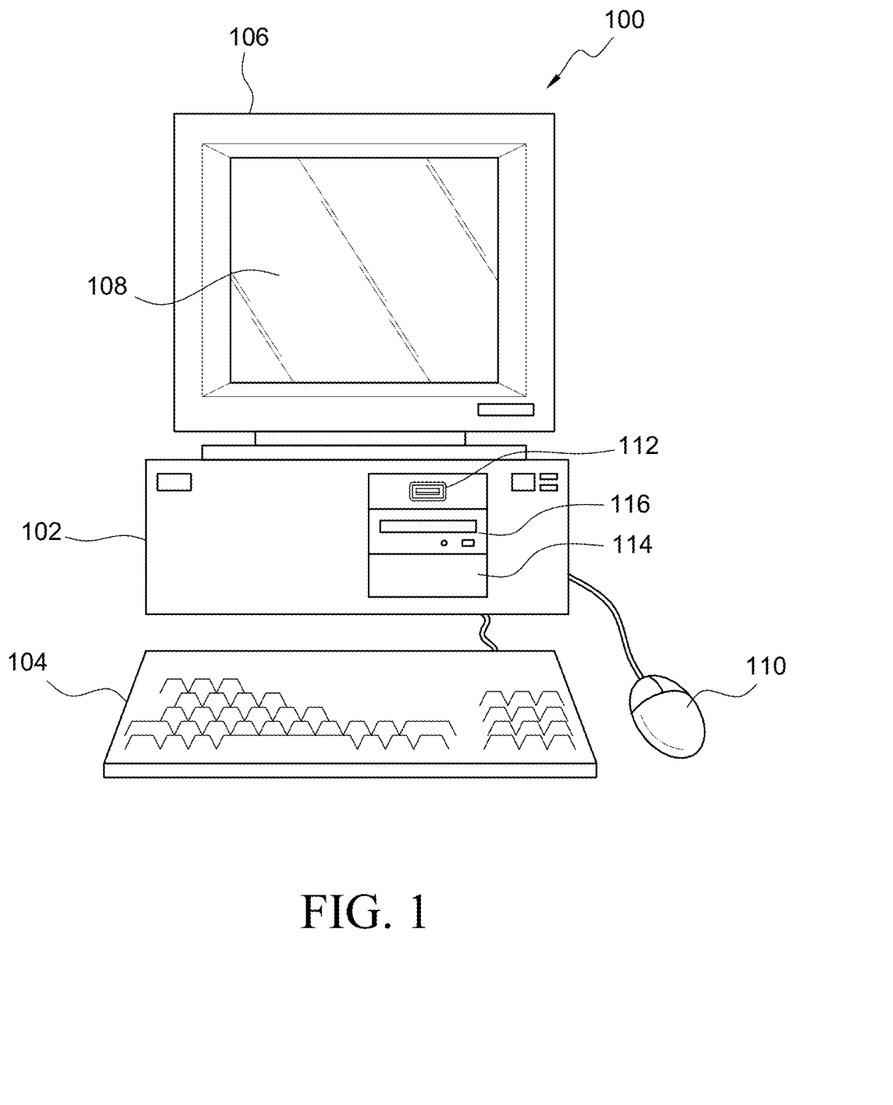
FIG. 1 illustrates a front elevational view of a computer system that is suitable for implementing an embodiment of the system disclosed in FIG. 3.
Figure 2:
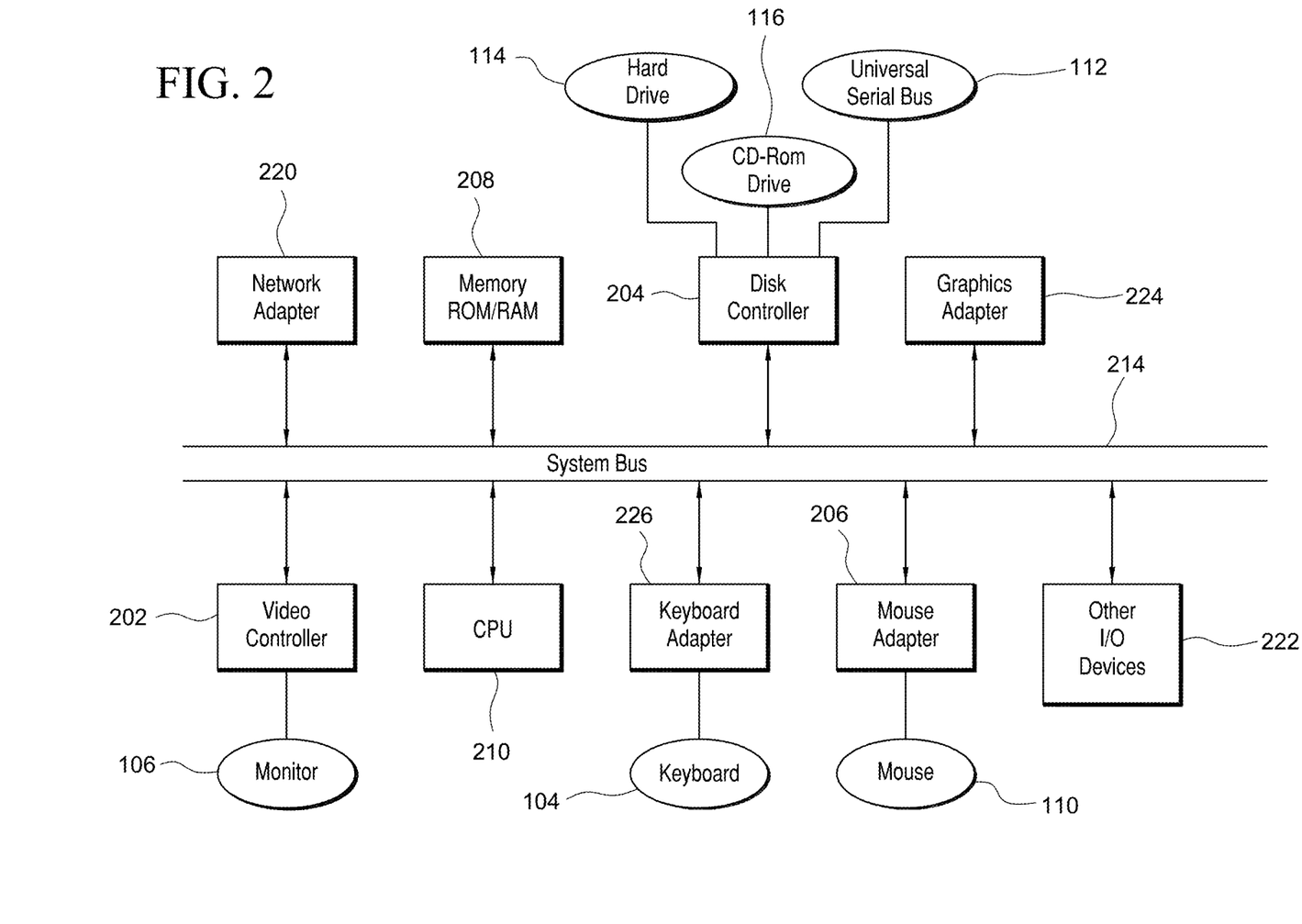
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
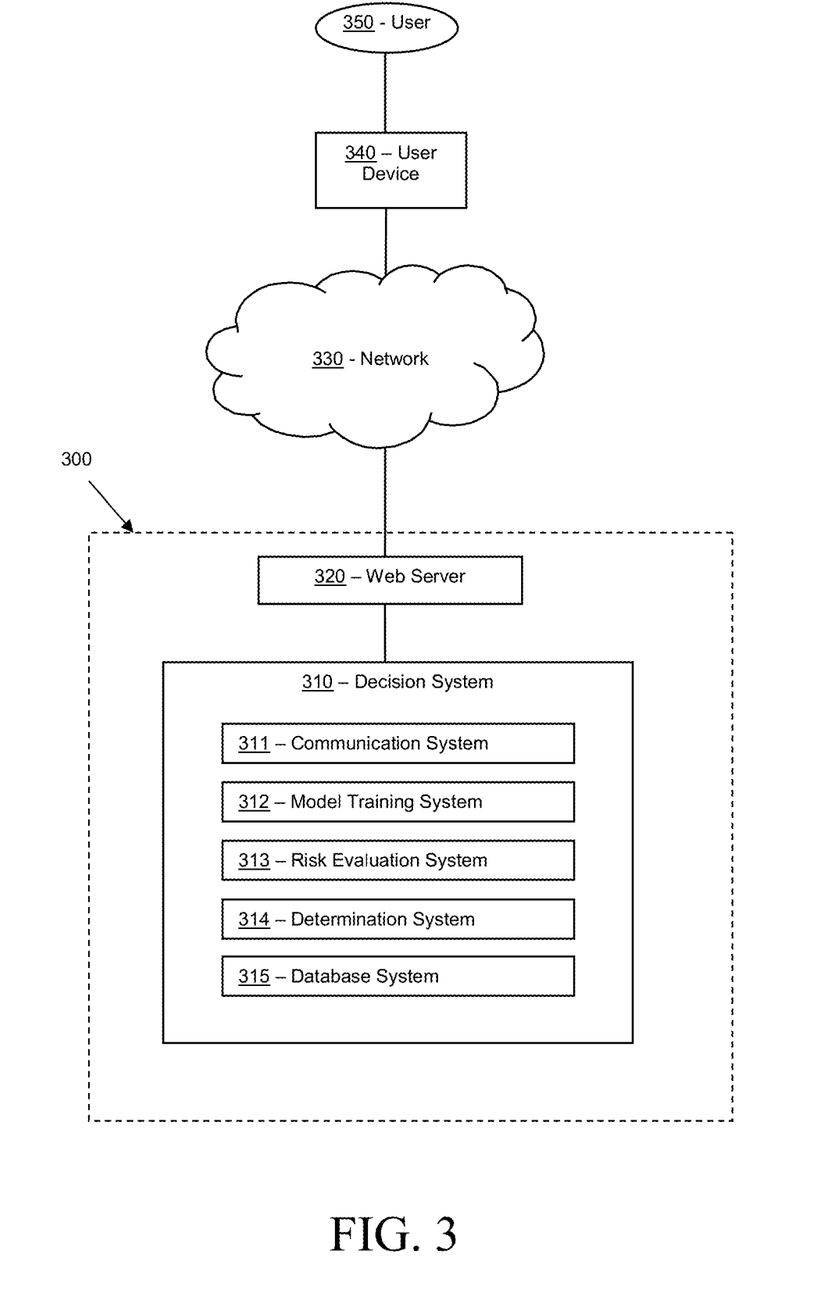
FIG. 3 illustrates a block diagram of a system that can be employed for training machine-learning models with fairness improvement, according to an embodiment.

Turning ahead in the drawings, FIG. 3 illustrates a block diagram of a system 300 that can be employed for training machine-learning models with fairness improvement, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a decision system 310 and/or a web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Decision system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host decision system 310 and/or web server 320. Additional details regarding decision system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a web site, or provide a server that interfaces with an application (e.g., a mobile application), on user device 340, which can allow users (e.g., 350) to input data, modify configuration settings and/or metrics, obtain an output based on the input data, and/or to perform other suitable activities, or to interface with and/or configure decision system 310.

In some embodiments, an internal network that is not open to the public can be used for communications between decision system 310 and web server 320 within system 300. Accordingly, in some embodiments, decision system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Lumia® or similar product by the Nokia Corporation of Keilaniemi, Espoo, Finland, and/or (iii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Android™ operating system developed by the Open Handset Alliance, or (iii) the Windows Mobile™ operating system by Microsoft Corp. of Redmond, Washington, United States of America.

In many embodiments, decision system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to decision system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of decision system 310 and/or web server 320. In a similar manner, the processors and/or the non-transitory computer-readable media can be local and/or remote to each other.

Meanwhile, in many embodiments, decision system 310 and/or web server 320 also can be configured to communicate with one or more databases, such as a database system 315. The one or more databases can include historical data used in training a machine learning model, for example, among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, decision system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, decision system 310 can include a communication system 311, a model training system 312, a risk evaluation system 313, a determination system 314, and/or database system 315. In many embodiments, the systems of decision system 310 can be modules of computing instructions (e.g., software modules) stored at non-transitory computer readable media that operate on one or more processors. In other embodiments, the systems of decision system 310 can be implemented in hardware. Decision system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host decision system 310 and/or web server 320. Additional details regarding decision system 310 and the components thereof are described herein.

Conventional approaches to training machine-learning models can result in models that lack fairness, such as models that output results that have disparate treatment or disparate impact on legally protected groups. For example, various laws, such as fair lending laws, prevent discrimination against protected groups, such as groups based on age, gender, race, and/or other characteristics. Some conventional approaches attempted to address these fairness concerns by manually removing various variables that were input into the model. However, removing these inputs can result in models that are based on less data, which can cause the models to have worse performance.

In a number of embodiments, the techniques described herein can provide a technical improvement over conventional approaches by automatically incorporating fairness improvements into the development of the machine-learning models by incorporated such fairness adjustments within the model training during in-model development. For example, control parameters can be built into the model for each fairness metric to minimize disparities or unfairness in the model.

In many embodiments, these techniques can advantageously be applied to many types of machine learning models, such as models used for or as part of credit underwriting models, credit line management models, payment hold models, portfolio management models, loss mitigation models, loan processing automation models, fraud detection and prevention models, and/or other suitable types of models, to enable fairness treatment, broaden credit accessibility, and/or increase financial inclusiveness for groups of applicants who apply for loans and credit lines, such as minorities and other protected groups.

In some embodiments, these techniques can beneficially improve the fairness of machine learning models in several aspects that span over data fairness, variable fairness, and/or model fairness perspectives. In a number of embodiments, these techniques can provide quantitative and/or business-effective model performance and fairness measurements over a large pool of alternative models that are automatically developed with varying degree of emphasis on the specified fairness metrics over protected groups identified by age, gender, race, marital status, health status, sexual orientation, and/or other factors, such as factors specified by legal regulations. These techniques also can enable data fairness by automatically generating fair data labeling to augment the development dataset. Variable fairness and model fairness can be achieved by using a self-adaptively updated control vector within the modeling process, which can control the disparate impact minimization while maximizing model performance. This self-adaptive control can allow for disparate impact on each protected group to be minimized separately.

In a number of embodiments, these techniques can advantageously handle a variety of different fairness specifications or requirements, such as demographic parity, equal odds, equal opportunities, etc., and/or can produce different final models that satisfy the specific requirements. Given the input data (such as real-time and time-sequence of historical financial attributes, member data, loan/credit application data, etc.) and specific fairness specifications that can be chosen from a variety of fairness evaluation methodologies, the techniques can automatically perform fairness improvements over data, attributes, automatically develop and select among a large pool of alternative models to output a final machine-learning model with maximum performance that satisfy the fairness specifications. Additionally these techniques can output a pool of alternative models with different degrees of emphasis on disparate impacts minimization and highest model performance, and can identify features leading to disparate impacts.

Figure 4:
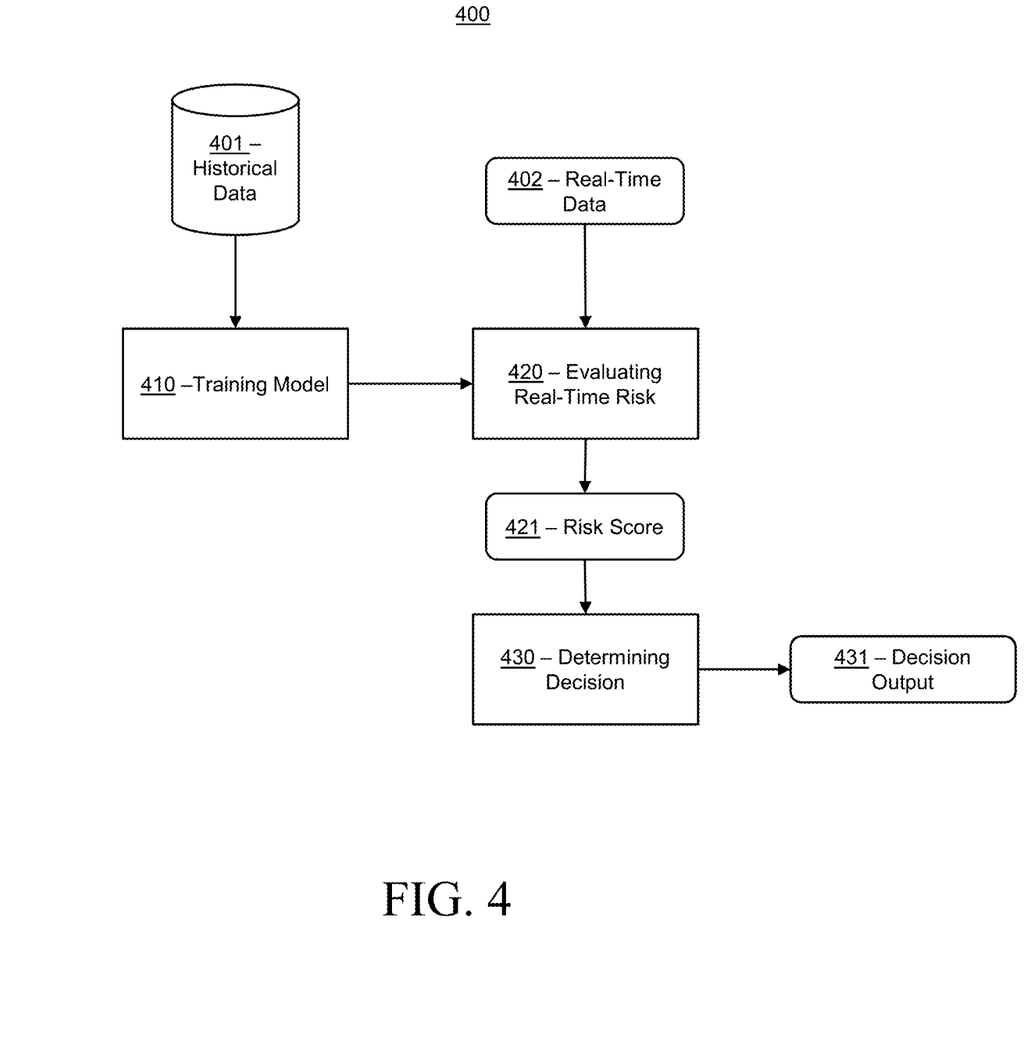
FIG. 4 illustrates a flow chart for a method of training machine-learning models with fairness improvement and using such models, according to an embodiment.

Turning ahead in the drawings, FIG. 4 illustrates a flow chart for a method 400 of training machine-learning models with fairness improvement and using such models, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), decision system 310 (FIG. 3), and/or web server 320 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 400 and other activities in method 400 can include using a distributed network including distributed memory architecture to perform the associated activity. This distributed architecture can reduce the impact on the network and system resources to reduce congestion in bottlenecks while still allowing data to be accessible from a central location.

As shown in FIG. 4, method 400 can include an activity 410 of training a model, which can be based on historical data 401. For example, for a credit risk application, a machine-learning model can be trained based on historical data 401, which can be historical credit risk data. In some embodiments, historical data 401 can be stored in database system 315 (FIG. 3). In some embodiments, activity 410 can be performed by model training system 312 (FIG. 3). In a number of embodiments, the model can be trained such as shown in method 500 (FIG. 5), and described below. Once the model is trained, it can be stored for use in real-time decision-making on new data. For example, in some embodiments, the model, as trained, can be accessed using a real-time API (application programming interface) call.

In a number of embodiments, method 400 also can include an activity 420 of evaluating real-time risk, which can be based on real-time data 402. Real-time data 402 can be based on an incoming application request with real-time data sent to decision system 310 (FIG. 3). In many embodiments, activity 420 can be performed by risk evaluation system 313 (FIG. 3). In several embodiments, the stored model (trained in activity 410) can be used to generate a risk score 421 for the application request.

In several embodiments, method 400 additionally can include an activity 430 of determining a decision based on risk score 421. In many embodiments, activity 430 can be performed by determination system 314 (FIG. 3). In several embodiments, activity 430 can consider risk score 421 and/or other factors, such as policies, rules, etc., in a decision model, to determine whether or not to approve (or recommend approving) the application. This decision can be output in decision output 431.

Figure 5:
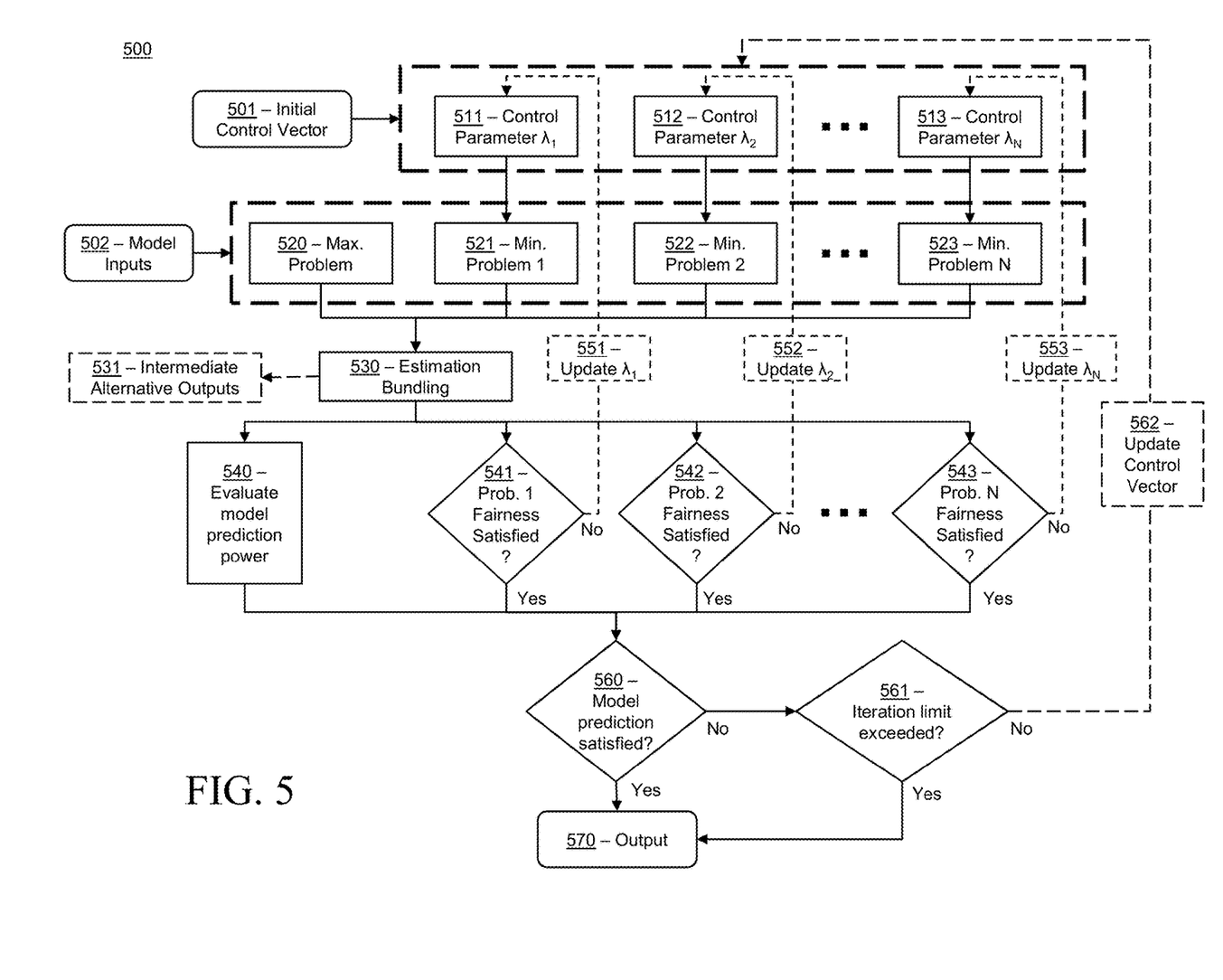
FIG. 5 illustrates a flow chart for a method of training machine-learning models with fairness improvement, according to an embodiment.

Turning ahead in the drawings, FIG. 5 illustrates a flow chart for a method 500 of training machine-learning models with fairness improvement, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. Method 500 can be similar to activity 410 (FIG. 4).

In many embodiments, system 300 (FIG. 3), decision system 310 (FIG. 3), model training system 312 (FIG. 3), and/or web server 320 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 500 and other activities in method 500 can include using a distributed network including distributed memory architecture to perform the associated activity. This distributed architecture can reduce the impact on the network and system resources to reduce congestion in bottlenecks while still allowing data to be accessible from a central location.

In many embodiments, method 500 can train models to accurately identify risk while improving fairness among protected groups. "Group labels" can be created and/or used as demographic labels in records, which can be based on corresponding customer information and various criteria. Group labels can include age, gender, and race in CFPB (Consumer Financial Protection Bureau) practice: senior (62 years or older), non-senior, female, male, black, Hispanic, Asian and pacific islander (API), American Indian and Alaska native (AIAN), multiple racial, and white. In some other applications, the labels can be extended to include marital status, health status, sex orientation, and/or other suitable labels, such as when such information is available and/or subject to regulation. In the credit risk application example, individuals can be labeled in terms of age, gender, and race; non-senior is the benchmark group in age, male the benchmark group in gender, and white the benchmark group in race.

"Protected groups" can include the minority demographic groups identified in terms of age, gender, and race. The Equal Credit Opportunity Act makes it illegal for a creditor to discriminate in any aspect of a credit transaction based on certain characteristics, including but not limited to age, gender, and race. In the current CFPB recommended practice, the protected groups include senior, female, black, Hispanic, API, AIAN, and multiple racial. The protected groups can be further expanded depending on other criteria.

In many embodiments, a "fairness metric" can be used as a quantitative measurement showing how fair a predictor (e.g., classifier or regressor) is. Listed below are several fairness metrics that can be used:

Demographic parity:

$$Pr(\hat{Y}=1|D=0)=Pr(\hat{Y}=1|D=1)$$

Parity difference:

$$Pr(\hat{Y}=1|D=0)-Pr(\hat{Y}=1|D=1)$$

Equalized odds:

$$TPR_{D=0}=TPR_{D=1}; FPR_{D=0}=FPR_{D=1}$$

Equal opportunity:

$$TPR_{D=0}=TPR_{D=1}$$

where notation "Pr(•)" represents probability, D is a protected group variable, Y is the target, TPR is true positive rate, and FPR is false positive rate. Among the above fairness metrics, when D=0, it represents the benchmark group; when D=1, it denotes a protected group. The definitions of TPR and FPR are given below:

$$TPR=TP/P=TP/(TP+FN)$$

$$FPR=FP/N=FP/(TN+FP)$$

where P is a condition positive, N is a condition negative, TP is a true positive, TN is a true negative, FP is a false positive, and FN is a false negative.

As shown in FIG. 5, method 500 can include receiving model inputs 502. In some embodiments, model inputs 502 can include model data X and Y, predefined fairness metrics, and protected group labels. X represents the available attribute values to describe records, and is used to estimate target values in machine-learning practice. If there are M records and P attributes, then X includes M*P entries. Y represents the true labels for records, and is usually a vector of binary values (0 or 1). It is the target in machine-learning practice. For example, it can represent whether a record is in default (as 1) or not (as 0) in credit risk practice. Default is the failure to make timely interest or principal repayments on a debt, whether that debt is a loan or a security. Default risk can be a significant consideration for creditors.

The fairness metric defines how to quantitatively evaluate fairness. The fairness metrics described above can be used as a predefined fairness metric. Self-defined fairness metric also can be used, as long as it has a second order derivative. More than one fairness metrics can be used in this method, as described below in further detail.

Additionally, method 500 can include starting with an initial control vector 501. The control vector (lambda, $\lambda$) can be a parameter that controls the fairness improvement procedure in model training. The control vector lambda can include multiple elements, in which each element is a real number. The elements can be updated depending on the feedback from fairness measurement and/or model prediction power criteria. In some embodiments, initial control vector 501 can be manually input or predefined. The control vector can include N control parameters 511-513, which can be represented as $\lambda_1, \lambda_2, \ldots, \lambda_N$. N is the number of minimization problems, which can be based on the number of protected groups and/or the number of fairness metrics, as described below.

Once these inputs (e.g., 501, 502) are received method 500 can solve a maximization problem 520 and one or more minimization problems 521-523 to find a model, which can both maximizes the model prediction power and minimizes the disparate impacts on protected groups. There can be N+1 optimization problems to be solved in parallel: one model prediction power maximization problem, and N disparate minimization problems.

Without Fair Lending considerations, the maximization problem takes prediction accuracy as the goal. A formula of cross-entropy listed below can be used in the credit risk example, and one output of this maximization problem is an estimation of target Y, denoted as Y_pred_model.

$$\text{Max } f(Y, Y\_pred\_model)$$

where f(Y,Y_pred_model)

$$f(Y, Y\_pred\_model) = -\sum_{j=1}^{M} Y_j(\log Y\_pred\_model_j) - (1-Y_j)\log(1-Y\_pred\_model_j)$$

The N minimization problems compare protected groups to benchmark groups, given protected-benchmark compared items and the predefined fairness metrics. For example, if there is only one metric used, there can be N=7 minimization problems in the credit risk example when age (senior vs. non-senior), gender (female vs. male), and race (black vs. white, Hispanic vs. white, API vs. white, AIAN vs. white, and multi-racial vs. white) are considered. If there are multiple fairness metrics being used, for example, L metrics, then N=7L in this credit risk application. One output of each minimization problem also can include an estimation of target Y, denoted as Y_pred[i], i=1, 2, . . . , N. Each of the N minimization problems can use a separate control parameter (e.g., 511-513).

For any of the N minimization problem, it can be expressed as:

$$\text{Min } g(Y\_pred|D=1, Y\_pred|D=0),$$

where D=0 denotes the benchmark group, and D=1 the protected group. If fairness measurement is selected as parity difference, and the current comparison item is on age, then the above can be written as:

Min mean($Y\_pred|female$)−mean($Y\_pred|male$), given mean($Y\_pred|female$) is often greater than mean ($Y\_pred|male$).

Figure 8:
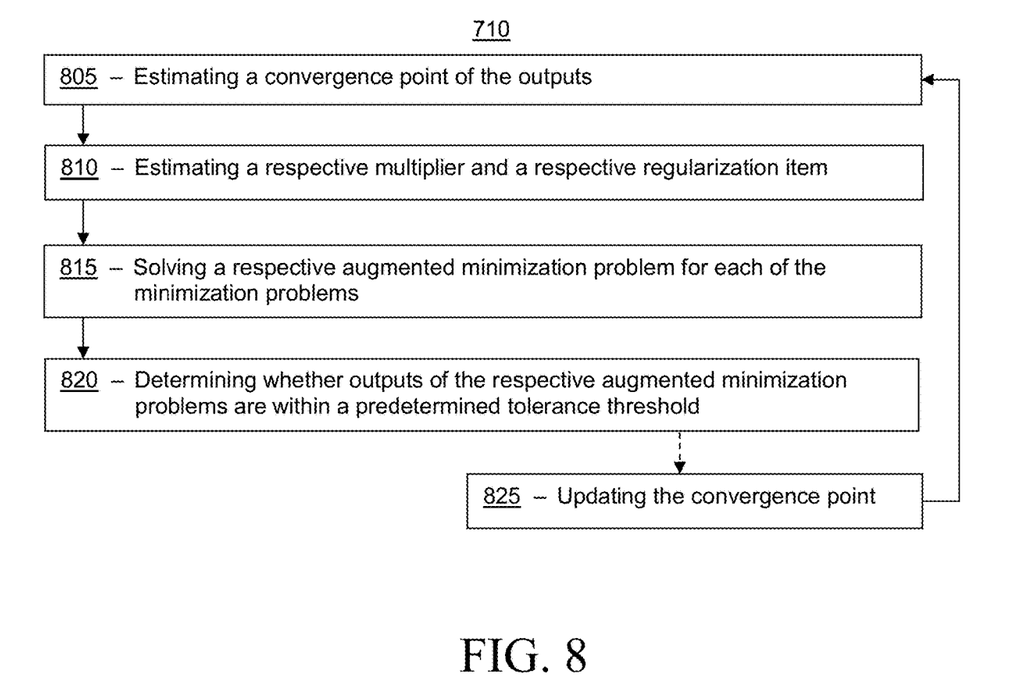
FIG. 8 illustrates a flow chart for the activity of FIG. 7 of performing an estimation bundling of outputs.

The outputs Y_pred_model and Y_pred[i] of the problems 520-523 can be used in an estimation bundling 530 of method 500 to generate a uniform estimation of Y across the whole N+1 problems. Estimation bundling 530 can be a procedure of unifying the N+1 estimations of Y. In some embodiments, estimation bundling 530 can be implemented as shown in method 800 and described below.

Once a uniform Y_pred is generated from the bundling process, the model prediction power and disparate analysis are evaluated upon this Y_pred. For example, method 500 can include activity 540 of evaluating the model prediction power, and activities 541-543 of evaluating and determining whether the uniform Y_pred result satisfies each of the fairness criteria in each of the N cases. For any of the N protected-benchmark comparison items whose fairness results do not satisfy the fairness criteria, the corresponding entries in the control vector lambda can be updated. As an example, if only problems 1 and 2 do not satisfy fairness results, Y_pred[1] and Y_pred[2] can be regenerated through modifying their corresponding lambda entries, lambda[1] and lambda[2], but keep the other lambda entries the same. One way of updating lambda[i]=α*lambda[i], where α>1, if the problem i does not meet the fairness requirement with the given fairness metrics. For example, one or more of activities 551-553 can be used to update lambda for each such problem i, such that the control parameter (e.g., 511-513) are updated for regenerating an output of the minimization problem i.

Once the fairness metric is satisfied for each of the problems, method 500 can include a determination 560 of whether the model prediction power satisfies accuracy requirements, as evaluated in activity 540. If the model prediction power and fairness examinations satisfy the requirements, method 500 can output one or more of outputs 570, such as the model structure and/or the parameters, the estimation of target Y_pred, and/or the control vector lambda. The model structure and parameters can be stored in any appropriate file formats, such as in a pickled file, json file, h5 file, etc., which can be directly called or used in the real-time risk evaluation module.

The model structure can depend on the model type selected by the user (e.g., 350). For example, if the output model is selected as a GBM (gradient boosting machine) model, it can include a number of trees, a max depth of trees, a number of leaf nodes, a minimum number of data points in each leaf node, features used in model, a learning rate, regularization parameters used to avoid overfitting, etc. If the output model is a deep learning model, the output model structure and/or parameters can include a number of layers, a number of units in the input, hidden, and output layers, activation functions, regularizations, weights matrix, etc.

If the model prediction does not meet the sufficient accuracy requirement, method 500 can include a determination 561 of whether a predetermined iteration limit K has been exceeded. If not, method 500 can include an activity 562 of updating the control vector lambda, such as all entities (e.g., control parameters) of the control vector lambda; otherwise, if the iteration K has been exceeded the method 500 can proceed to directly output one or more of outputs 570, such as model, the Y_pred, and the control vector lambda. The number K can be a sufficiently large number to update the control vector lambda enough times. For example, number K can be set as 10,000 or more. There can be multiple ways to update all entries of the control vector lambda. One way to update all entries of lambda is setting lambda[i]=β*lambda[i], for i=1, 2, . . . , N, and scale down factor 0<β<1.

As long as there is an identified Y_pred after estimation bundling 530, the corresponding model can be output and stored as an intermediate alternative output 531. Since Y_pred can be updated multiple times to either improve fairness or prediction power, there are finally multiple different intermediate alternative outputs 531, which can also be used as a candidate model pool for users (e.g., business users) to select according to their various risk appetite or pursuing of fairness.

Figure 6:
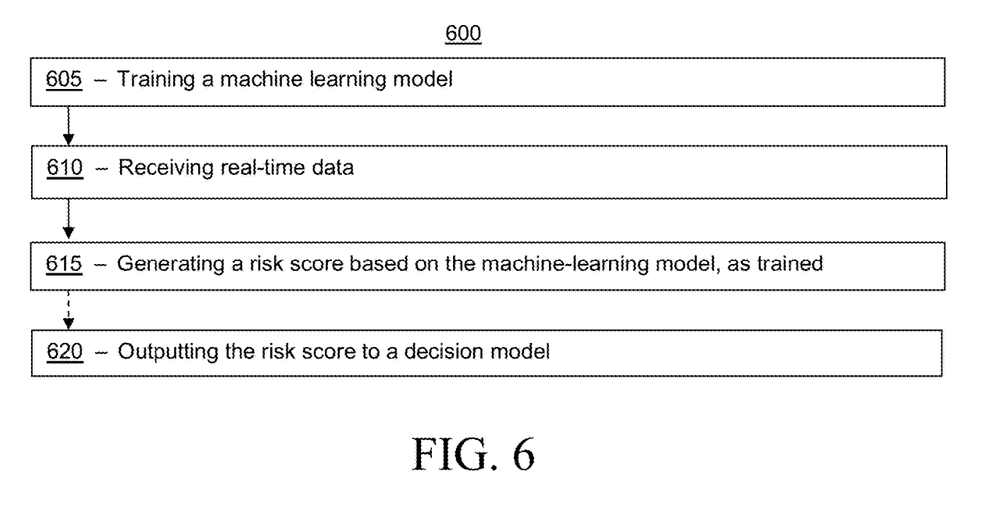
FIG. 6 illustrates a flow chart for a method of training machine-learning models with fairness improvement and using the trained model, according to another embodiment.

Turning ahead in the drawings, FIG. 6 illustrates a flow chart for a method 600 of training machine-learning models with fairness improvement and using the trained model, according to another embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 300 (FIG. 3), decision system 310 (FIG. 3), and/or web server 320 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of system 300 (FIG. 3). The processor(s) can be similar or identical to the processor(s) described above with respect to computer system 100 (FIG. 1).

In some embodiments, method 600 and other activities in method 600 can include using a distributed network including distributed memory architecture to perform the associated activity. This distributed architecture can reduce the impact on the network and system resources to reduce congestion in bottlenecks while still allowing data to be accessible from a central location.

Figure 7:
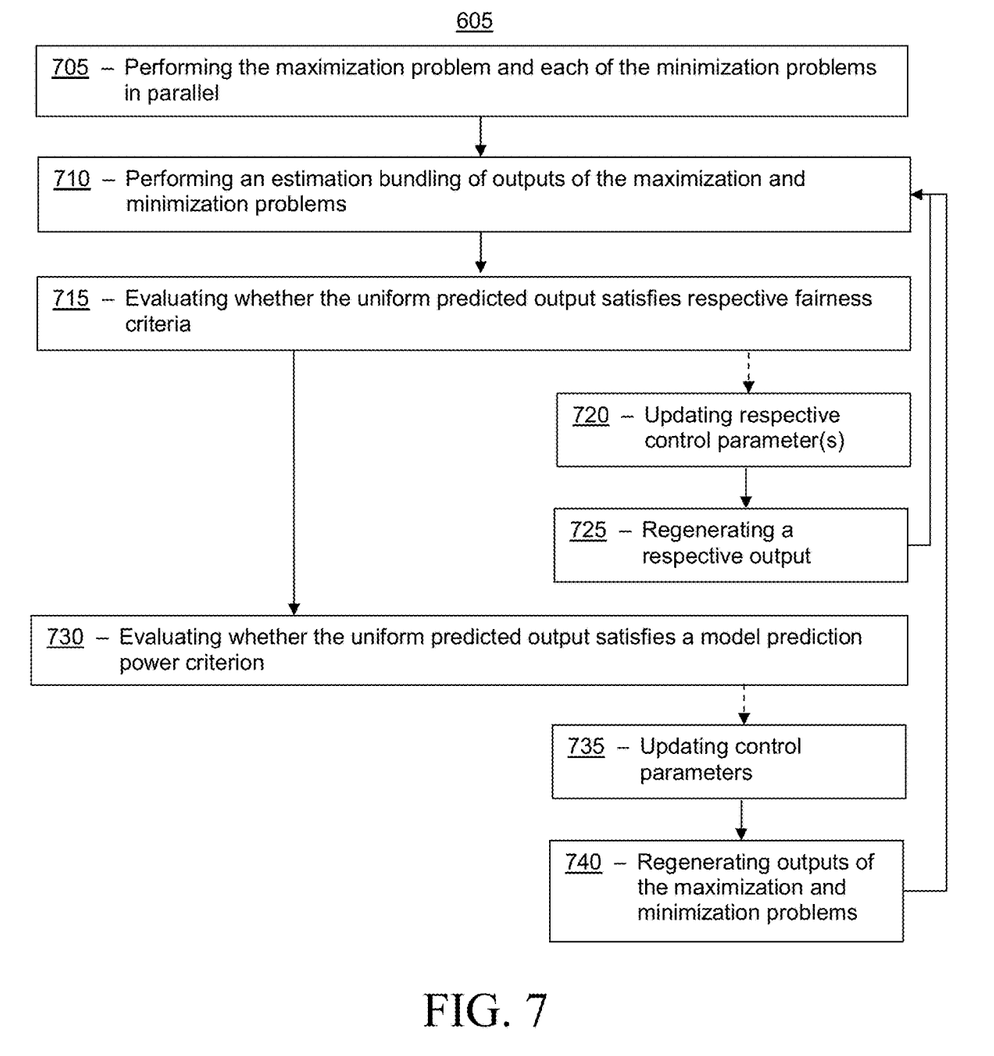
FIG. 7 illustrates a flow chart for the activity of FIG. 6 of training a machine-learning model.

Referring to FIG. 6, method 600 can include an activity 605 of training a machine-learning model, based on historical data, with a maximization problem and one or more minimization problems to improve one or more fairness metrics. Activity 605 can be similar or identical to activity 410 (FIG. 4) and/or method 500 (FIG. 5), and/or can be implemented as shown in FIG. 7 and described below. The machine-learning model can be similar or identical to the models output in outputs 570 (FIG. and/or intermediate alternative outputs 531 (FIG. 5). The maximization problem can be similar or identical to maximization problem 520 (FIG. 5), which can be maximizing a model prediction power. The minimization problems can be similar or identical to minimization problems 521-523 (FIG. 5). The historical data can be similar or identical to historical data 401 (FIG. 4) and/or historical data included in model inputs 502 (FIG. 5).

In a number of embodiments, method 600 also can include an activity 610 of receiving real-time data. The real-time data can be similar or identical to real-time data 402 (FIG. 4).

In several embodiments, method 600 additionally can include an activity 615 of generating a risk score based on the machine-learning model, as trained, and the real-time data. Activity 615 can be similar or identical to activity 420 (FIG. 4). The risk score can be similar or identical to risk score 421 (FIG. 4).

In a number of embodiments, method 600 further can include an activity 620 of outputting the risk score to a decision model to determine whether to approve a credit application. The decision model can be similar or identical to the decision model applied in activity 430 (FIG. 4), which can be used to generate a decision output (e.g., 431 (FIG. 4)). In certain embodiments, the historical data is historical credit risk data. In certain embodiments, the real-time data is real-time credit risk data for the credit application.

Turning ahead in the drawings, FIG. 7 illustrates a flow chart for activity 605 of training a machine-learning model. Activity 605 is merely exemplary and is not limited to the embodiments presented herein. Activity 605 can be employed in many different embodiments or examples not specifically depicted or described herein. In some embodiments, the procedures, the processes, and/or the activities of activity 605 can be performed in the order presented. In other embodiments, the procedures, the processes, and/or the activities of activity 605 can be performed in any suitable order. In still other embodiments, one or more of the procedures, the processes, and/or the activities of activity 605 can be combined or skipped.

Referring to FIG. 7, activity 605 can include an activity 705 of performing the maximization problem and each of the one or more minimization problems in parallel. In some embodiments, each of the one or more minimization problems can compare a respective protected group against a benchmark group based on a respective one of the one or more fairness metrics. In certain embodiments, activity 705 can be similar or identical to solving problems 520-523 (FIG. 5).

In a number of embodiments, activity 605 also can include an activity 710 of performing an estimation bundling of outputs of the maximization problem and the one or more minimization problems to generate a uniform predicted output. In many embodiments, activity 710 can be similar or identical to estimation bundling 530 (FIG. 5), and/or can be implemented as shown in FIG. 8 and described below.

In several embodiments, activity 605 additionally can include an activity 715 of evaluating whether the uniform predicted output satisfies respective fairness criteria associated with the one or more minimization problems. In some embodiments, activity 715 can be similar or identical to the evaluation performed to make the determinations in activities 541 (FIG. 5).

In a number of embodiments, when one or more of the respective fairness criteria are not satisfied, activity 605 further can include an activity 720 of updating a respective control parameter for each of the one or more minimization problems that are associated with the one or more of the respective fairness criteria that are not satisfied; and an activity 725 of regenerating a respective output for each of the one or more minimization problems that are associated with the one or more of the respective fairness criteria that are not satisfied, using the respective control parameters, as updated. After performing activities 720 and 725, activity 605 can return to activity 710. Activity 720 can be similar or identical to activities 551-553 (FIG. 5). Activity 725 can be similar or identical to solving one or more of minimization problems 521-523 after one or more of control parameters 511-513 are updated.

When the respective fairness criteria are satisfied, activity 605 can proceed to an activity 730 of evaluating whether the uniform predicted output satisfies a model prediction power criterion. Activity 730 can be similar or identical to activity 540 (FIG. 5).

In a number of embodiments, when the model prediction power criterion is not satisfied, and before reaching a predetermined number of iterations, activity 605 further can include an activity 735 of updating control parameters for the maximization problem and the minimization problems; and an activity 740 of regenerating outputs of the maximization problem and the one or more minimization problems, using the control parameters, as updated. In some embodiments, activity 735 can be similar or identical to activity 562 (FIG. 5). In some embodiments, activity 740 can be similar or identical to solving minimization problems 521-523 after control parameters 511-513 are updated. Determining if the model prediction power criterion is satisfied can be similar or identical to determination 560 (FIG. 5). The predetermined number of iterations can be similar or identical to the iteration limit tested in determination 561 (FIG. 5). After performing activities 735 and 740, activity 605 can return to activity 710.

When the model prediction power criterion is satisfied, or the predetermined number of iterations has been reached, activity 605 can end, such as with outputting an output, such as output 570 (FIG. 5).

Turning ahead in the drawings, FIG. 8 illustrates a flow chart for activity 710 of performing an estimation bundling of outputs. Activity 710 is merely exemplary and is not limited to the embodiments presented herein. Activity 710 can be employed in many different embodiments or examples not specifically depicted or described herein. In some embodiments, the procedures, the processes, and/or the activities of activity 710 can be performed in the order presented. In other embodiments, the procedures, the processes, and/or the activities of activity 710 can be performed in any suitable order. In still other embodiments, one or more of the procedures, the processes, and/or the activities of activity 710 can be combined or skipped.

Referring to FIG. 8, activity 710 can include an activity 805 of estimating a convergence point of the outputs of the maximization problem and the one or more minimization problems. The outputs can be similar or identical to Y_pred_model and Y_pred[i] that are output when solving the problems 520-523 (FIG. 5). In many embodiments, activity 805 estimates the potential convergence point, given the Y_pred_model, Y_pred[i], . . . , Y_pred[N] from the N+1 optimization problems. As an example, the estimated convergence point can be set as (Y_pred_model+ lambda[i]*Y_pred[1]+ . . . +lambda[N]*Y_pred[N])/(1+ lambda[1]+ . . . +lambda[N]), denoted as Y_mean.

In a number of embodiments, activity 710 also can include an activity 810 of estimating a respective multiplier W[i] and a respective regularization item for each of the one or more minimization problems (i). A regularization item for problem i can be estimated, and can be added to form an augmented problem for the ith minimization problem. The augmented optimization problem enforces the estimation Y_pred[i] to be closer to the convergence point Y_mean.

Here, the multiplier can be generated as $W[i]=W[i]+\rho*(Y\_pred[i]-Y\_mean)$, where $W[i]$ is set to 0 at the initial step, and $\rho$ is a user predetermined scalar or vector with the same size of $Y\_pred[i]$.

In several embodiments, activity 710 additionally can include an activity 815 of solving a respective augmented minimization problem (i) for each of the one or more minimization problems. The augmented optimization problem can be expressed as $$\min f(Y\_pred[i]) + W[i]*Y\_pred[i] + \rho/2*(Y\_pred[i]-Y\_mean)^2.$$

In a number of embodiments, activity 710 further can include an activity 820 of determining whether outputs of the respective augmented minimization problems are within a predetermined tolerance threshold. After solving the N augmented minimization problems, the convergence point Y_mean is output as the bundling process solution, if the N+1 estimations of target are all the same or within the predetermined tolerance threshold. The predetermined tolerance threshold can be enforced by $|Y\_pred\_model - Y\_mean| \leq \varepsilon$, $|Y\_pred[i] - Y\_mean| \leq \varepsilon$, where $i=1, 2, \ldots, N$, and tolerance $\varepsilon$ is a small positive number which is predetermined by the user, e.g., ($\varepsilon=10^{-5}$, or even smaller).

In a number of embodiments, when the outputs of the respective augmented minimization problems are not within a predetermined tolerance threshold, activity 710 further can include an activity 825 of updating control parameters for the maximization problem and the minimization problems. If one of the absolute differences between Y_mean and estimation of Y is greater than $\varepsilon$, then the convergence point Y_mean can be updated, and the N+1 augmented optimization problems can be solved based on the updated Y_mean and multipliers W[i]. After performing activity 825, activity 710 can return to activity 805.

When the outputs of the respective augmented minimization problems are within the predetermined tolerance threshold, activity 710 can end.

In many embodiments, the techniques described herein can provide a practical application and several technological improvements. In some embodiments, the techniques described herein can provide for training machine-learning models with fairness improvement. The techniques described herein can provide a significant improvement over conventional approaches that fail to incorporate fairness improvements and/or use inferior manual approaches that remove relevant data inputs. In some embodiments, the techniques described herein can use parallel calls, such as to solve the problems (e.g., 520-523), which can provide for performance improvements.

In a number of embodiments, the techniques described herein can solve a technical problem that arises only within the realm of computer networks, as machine learning is a concept that does not exist outside the realm of computer networks. Moreover, the techniques described herein can solve a technical problem that cannot be solved outside the context of computer networks. Specifically, the techniques described herein cannot be used outside the context of computer networks, in view of a lack of data, and the inability to perform machine learning models without a computer.

Various embodiments can include a system including one or more processors and one or more non-transitory computer-readable media storing computing instructions that, when executed on the one or more processors, cause the one or more processors to perform certain acts. The acts can include training a machine-learning model, based on historical data, with a maximization problem and one or more minimization problems to improve one or more fairness metrics. The acts also can include receiving real-time data. The acts additionally can include generating a risk score based on the machine-learning model, as trained, and the real-time data.

A number of embodiments can include a method being implemented via execution of computing instructions configured to run at one or more processors. The method can include training a machine-learning model, based on historical data, with a maximization problem and one or more minimization problems to improve one or more fairness metrics. The method also can include receiving real-time data. The method additionally can include generating a risk score based on the machine-learning model, as trained, and the real-time data.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although training machine-learning models with fairness improvement has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 4-8 may include different procedures, processes, and/or activities and be performed by many different modules, in many different orders, and/or one or more of the procedures, processes, or activities of FIGS. 4-8 may include one or more of the procedures, processes, or activities of another different one of FIGS. 4-8. As another example, the systems within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:
   one or more processors; and
   one or more non-transitory computer-readable media storing computing instructions that, when executed on the one or more processors, cause the one or more processors to perform:
      training a machine-learning model, based on historical data, with a maximization problem and one or more minimization problems to improve one or more fairness metrics;
      receiving real-time data; and
      outputting a risk score generated based on the machine-learning model, as trained, and the real-time data,
   wherein training the machine-learning model further comprises performing an estimation bundling of outputs of the maximization problem and the one or more minimization problems to generate a uniform predicted output; and
   wherein performing the estimation bundling further comprises:
      (a) estimating a convergence point of the outputs of the maximization problem and the one or more minimization problems;
      (b) estimating a respective multiplier and a respective regularization item for each of the one or more minimization problems;
      (c) solving a respective augmented minimization problem for each of the one or more minimization problems;
      (d) determining whether outputs of the respective augmented minimization problems are within a predetermined tolerance threshold; and
      (e) updating the convergence point and reiterating (b), (c), and (d) when the outputs of the respective augmented minimization problems are not within the predetermined tolerance threshold.

2. The system of claim 1, wherein training the machine-learning model further comprises:
   performing the maximization problem and each of the one or more minimization problems in parallel.

3. The system of claim 1, wherein each of the one or more minimization problems compare a respective protected group against a benchmark group based on a respective one of the one or more fairness metrics.

4. The system of claim 1, wherein outputting the risk score further comprises:
   outputting the risk score to a decision model to determine whether to approve a credit application,
   wherein:
      the historical data is historical credit risk data; and
      the real-time data is real-time credit risk data for the credit application.

5. The system of claim 1, wherein training the machine-learning model further comprises:
   evaluating whether the uniform predicted output satisfies respective fairness criteria associated with the one or more minimization problems.

6. The system of claim 5, wherein training the machine-learning model further comprises, when one or more of the respective fairness criteria are not satisfied:
   updating a respective control parameter for each of the one or more minimization problems that are associated with the one or more of the respective fairness criteria that are not satisfied; and
   regenerating a respective output for each of the one or more minimization problems that are associated with the one or more of the respective fairness criteria that are not satisfied, using the respective control parameters, as updated.

7. The system of claim 1, wherein training the machine-learning model further comprises:
   evaluating whether the uniform predicted output satisfies a model prediction power criterion.

8. The system of claim 7, wherein training the machine-learning model further comprises, when the model prediction power criterion is not satisfied, and before reaching a predetermined number of iterations:
   updating control parameters for the maximization problem and the minimization problems; and
   regenerating outputs of the maximization problem and the one or more minimization problems, using the control parameters, as updated.

9. A computer-implemented method comprising:
   training a machine-learning model, based on historical data, with a maximization problem and one or more minimization problems to improve one or more fairness metrics;
   receiving real-time data; and
   outputting a risk score generated based on the machine-learning model, as trained, and the real-time data,
   wherein training the machine-learning model further comprises performing an estimation bundling of outputs of the maximization problem and the one or more minimization problems to generate a uniform predicted output; and
   wherein performing the estimation bundling further comprises:
      (a) estimating a convergence point of the outputs of the maximization problem and the one or more minimization problems;
      (b) estimating a respective multiplier and a respective regularization item for each of the one or more minimization problems;
      (c) solving a respective augmented minimization problem for each of the one or more minimization problems;
      (d) determining whether outputs of the respective augmented minimization problems are within a predetermined tolerance threshold; and (e) updating the convergence point and reiterating (b), (c), and (d) when the outputs of the respective augmented minimization problems are not within the predetermined tolerance threshold.

10. The computer-implemented method of claim 9, wherein training the machine-learning model further comprises:
   performing the maximization problem and each of the one or more minimization problems in parallel.

11. The computer-implemented method of claim 9, wherein each of the one or more minimization problems compare a respective protected group against a benchmark group based on a respective one of the one or more fairness metrics.

12. The computer-implemented method of claim 9, wherein outputting the risk score further comprises:
   outputting the risk score to a decision model to determine whether to approve a credit application,
   wherein:
      the historical data is historical credit risk data; and
      the real-time data is real-time credit risk data for the credit application.

13. The computer-implemented method of claim 9, wherein training the machine-learning model further comprises:
   evaluating whether the uniform predicted output satisfies respective fairness criteria associated with the one or more minimization problems.

14. The computer-implemented method of claim 13, wherein training the machine-learning model further comprises, when one or more of the respective fairness criteria are not satisfied:
   updating a respective control parameter for each of the one or more minimization problems that are associated with the one or more of the respective fairness criteria that are not satisfied; and
   regenerating a respective output for each of the one or more minimization problems that are associated with the one or more of the respective fairness criteria that are not satisfied, using the respective control parameters, as updated.

15. The computer-implemented method of claim 9, wherein training the machine-learning model further comprises:
   evaluating whether the uniform predicted output satisfies a model prediction power criterion.

16. The computer-implemented method of claim 15, wherein training the machine-learning model further comprises, when the model prediction power criterion is not satisfied, and before reaching a predetermined number of iterations:
   updating control parameters for the maximization problem and the minimization problems; and
   regenerating outputs of the maximization problem and the one or more minimization problems, using the control parameters, as updated.

* * * * *